US012007801B2

(12) United States Patent
Lee et al.

(10) Patent No.: US 12,007,801 B2
(45) Date of Patent: Jun. 11, 2024

(54) CAPACITOR-LESS LOW DROPOUT REGULATOR USING DUAL FEEDBACK LOOP STRUCTURE

(71) Applicant: Korea University Research and Business Foundation, Seoul (KR)

(72) Inventors: Hyung-Min Lee, Seoul (KR); Hyun Jun Park, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 189 days.

(21) Appl. No.: 17/885,848

(22) Filed: Aug. 11, 2022

(65) Prior Publication Data

US 2023/0085353 A1 Mar. 16, 2023

(30) Foreign Application Priority Data

Sep. 16, 2021 (KR) ........................ 10-2021-0124327

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

| | | | | |
|---|---|---|---|---|
| 9,130,466 B2 * | 9/2015 | Huang | .............. | H02M 3/33507 |
| 11,616,436 B2 * | 3/2023 | Mei | ..................... | H02M 1/0025 323/282 |
| 2022/0276666 A1 * | 9/2022 | Wu | ......................... | H03F 1/083 |

FOREIGN PATENT DOCUMENTS

| | | |
|---|---|---|
| JP | 6641169 B2 | 2/2020 |
| KR | 10-0995515 B1 | 11/2010 |

(Continued)

OTHER PUBLICATIONS

Neuroscience-based Sleep Disorders Control Technology Development Final Report of the 3rd Year Stage of the Brain Science Research Institute Technology Development Project, *Korean Institute of Science and Technology*, Ministry of Science and Technology Information and Communication (Specialized Institution) National Research Foundation of Korea, Oct. 31, 2018, (119 pages in Korean).

(Continued)

*Primary Examiner* — Jeffrey A Gblende
(74) *Attorney, Agent, or Firm* — NSIP Law

(57) ABSTRACT

A capacitor-less low dropout regulator includes: a capacitor-less dual feedback loop unit including a plurality of feedback resistors, an error amplifier, and a transconductance cell to form a main loop passing through the error amplifier and a sub-loop passing through the gm cell without passing through the error amplifier; a dynamic compensation unit connected to a first main pole located at an output of the error amplifier and a second main pole located at an output of the gm cell to provide dynamic frequency compensation using a Miller effect to the first main pole and the second main pole according to a load current of the capacitor-less dual feedback loop unit; and a load current measurement unit configured to measure a load current of a third main (Continued)

pole formed at a load of the dual feedback loop unit to provide the load current to the dynamic compensation unit.

9 Claims, 7 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

FOREIGN PATENT DOCUMENTS

| | | | |
|---|---|---|---|
| KR | 10-2015-0134139 | A | 12/2015 |
| KR | 10-1592500 | B1 | 2/2016 |
| KR | 10-2018-0033090 | A | 4/2018 |
| KR | 10-2138768 | B1 | 7/2020 |

OTHER PUBLICATIONS

Korean Office Action issued on Sep. 20, 2022, in counterpart Korean Patent Application No. 10-2021-0044449 (6 pages in Korean).

* cited by examiner

CAPACITOR-LESS LOW DROPOUT REGULATOR USING DUAL FEEDBACK LOOP STRUCTURE

CROSS-REFERENCE TO RELATED APPLICATION

This application claims priority to and the benefit of Korean Patent Application No. 10-2021-0124327, filed on Sep. 16, 2021, the disclosure of which is incorporated herein by reference in its entirety.

BACKGROUND

1. Field of the Invention

The present disclosure relates to a capacitor-less low dropout regulator using a dual feedback loop structure, and more specifically, to an analog circuit design technology which variously moves a pole frequency, which is present in a dual feedback loop, using a Miller effect to have improved loop stability and transient response performance over a wide load current range.

2. Discussion of Related Art

In order to convert and rectify a high direct current (DC) voltage to a low DC voltage, a high-efficiency switching type voltage conversion circuit such as a buck converter or a switch capacitor is used. However, the switching type voltage conversion circuit has a disadvantage in that a large ripple and switching noise are generated in an output voltage.

In order to improve this, an analog low dropout (LDO) voltage regulator capable of supplying accurate DC power to an output terminal at a small output voltage ripple is mainly used. In addition, a capacitor-less low dropout (LDO) regulator not using an external capacitor can provide an accurate output voltage with a low cost and simple structure with only a small ripple. Accordingly, the LDO regulator is used in various semiconductor circuits such as Internet of Things (IoT), a system on chip (SOC), and the like.

However, in the capacitor-less LDO regulator, when a load current $I_{LOAD}$ is instantaneously changed, since a large external output capacitor which prevents a primary voltage change by supplying a current stored therein to the load first is not present, there is a disadvantage in that transient response performance is poor due to a large instantaneous change of the output voltage.

Further, in the capacitor-less LDO regulator, since high-frequency poles, which are present in the load, gradually move to lower frequencies, and thus become closer to other low-frequency poles, which are present in a feedback loop, as the load current $I_{LOAD}$ decreases, the stability of the feedback loop decreases. Accordingly, various circuit technologies have been proposed for operation while maintaining the stability in all load current regions and improvement of transient response characteristics.

In the LDO regulator, it can be said that the transient response characteristics are determined by a bandwidth and a slew rate. One of the various circuit technologies for having a wider bandwidth in the capacitor-less LDO regulator is the use of a dual-loop structure in which two feedback loops overlap each other.

In the capacitor-less LDO regulator in FIG. 1A among the various LDO regulators using the dual-loop structures, a main loop $NFL_M$ passing through feedback resistors $R_{F1}$ and $R_{F2}$ and an error amplifier EA, and a sub-loop $NFL_S$ directly passing through a gm cell without passing through the error amplifier EA are present.

In this structure, a total of three main poles ($\omega_{P1}$ which is present at an output of the EA, $\omega_{P2}$ which is located at an output of the gm cell, and last, $\omega_{P3}$ placed at the load) are present. In the case of the capacitor-less LDO regulator, $\omega_{P3}$ of the load is usually located in the highest frequency band among the three main poles due to the small capacitance of the load.

When $\omega_{P1}$ located at the output of the EA is located in the lowest frequency band among the main poles, the capacitor-less LDO regulator has the Bode plot in FIG. 1B. The main loop $NFL_M$ passes through both the EA and the gm cell and thus has a high loop gain, but passes through both poles $\omega_{P1}$ and $\omega_{P2}$ and thus is an unstable loop.

On the other hand, the sub-loop $NFL_S$ does not pass through the EA and the lowest frequency pole $\omega_{P1}$ and thus has a low loop gain, but has a stable wide bandwidth. These two loops generate a zero at frequencies where paths overlap to form a stable global loop $NFL_G$ having a high loop gain and a wide bandwidth.

The dual-loop structure has two major problems. First, in order to generate a zero at an appropriate frequency to have the Bode plot having stability as shown in FIG. 1B, a capacitor of a sufficient size should be added to $\omega_{P1}$ to make $\omega_{P1}$ the most dominant pole.

Second, when the load current $I_{LOAD}$ gradually decreases as shown in FIG. 2A and thus a load resistance component increases, $\omega_{P3}$ gradually approaches $\omega_{P1}$ and $\omega_{P2}$ to make the global loop $NFL_G$ unstable.

Accordingly, when $\omega_{P1}$ and $\omega_{P2}$ are separated from $\omega_{P3}$ using a compensation capacitor as shown in FIG. 2B in preparation for a stable operation in the case in which the load current $I_{LOAD}$ is low, stability is improved, but an opposite effect in that the bandwidth in the condition of an overall load current $I_{LOAD}$ is reduced occurs.

On the other hand, when a compensation capacitor, which is not large, is used for $\omega_{P1}$ and $\omega_{P2}$ not to reduce the bandwidth, a limitation in an LDO operation under the condition of a low load current $I_{LOAD}$ occurs.

PRIOR ART DOCUMENT

Patent Document (Patent Document 1) KR 10-2138768 B1
(Patent Document 2) KR 10-1592500 B1
(Patent Document 3) KR 10-0995515 B1

Non-Patent Document 1

(Non-Patent Document 1) S. W. Hong and G. H. Cho, "High-gain wide-bandwidth capacitor-less low-dropout (LDO) regulator for mobile applications utilizing frequency response of multiple feedback loops," IEEE Trans. Circuits Syst. I, Reg. Papers, vol. 63, no. 1, pp. 46-57, January 2016.

SUMMARY OF THE INVENTION

Accordingly, the present disclosure is directed to providing a capacitor-less low dropout regulator which performs frequency compensation in all load current conditions with only a capacitor of a small capacity through a Miller effect which dynamically changes according to a condition of a load, and does not limit a bandwidth in the case in which a load current is large to improve a transient response characteristic.

In one embodiment for realizing the above-described purpose of the present disclosure, a capacitor-less low dropout regulator using a dual feedback loop structure includes: a capacitor-less dual feedback loop unit including a plurality of feedback resistors, an error amplifier, and a transconductance cell (hereinafter, referred to as a gm cell) to form a main loop passing through the error amplifier and a sub-loop passing through the gm cell without passing through the error amplifier; a dynamic compensation unit connected to a first main pole located at an output of the error amplifier and a second main pole located at an output of the gm cell to provide dynamic frequency compensation using a Miller effect to the first main pole and the second main pole according to a load current of the capacitor-less dual feedback loop unit; and a load current measurement unit configured to measure a load current of a third main pole formed at a load of the dual feedback loop unit to provide the load current to the dynamic compensation unit.

In the embodiment of the present disclosure, the dynamic compensation unit may include: a first compensation capacitor and a second compensation capacitor respectively connected to the first main pole and the second main pole; and a differential amplifier connected to the second main pole, and configured to apply the Miller effect differently according to the load current transmitted from the load current measurement unit.

In the embodiment of the present disclosure, the dynamic compensation unit may further include a low-pass filter including a first resistor and a second capacitor connected to the second main pole to provide an input bias of the differential amplifier.

In the embodiment of the present disclosure, the dynamic compensation unit may further include a null resistor connected to the first compensation capacitor and the second compensation capacitor in series to remove a right-half plane (RHP) zero generated by the Miller effect.

In the embodiment of the present disclosure, the load current measurement unit may adjust a current of the differential amplifier according to the measured load current.

In the embodiment of the present disclosure, the load current measurement unit may adjust the current of the differential amplifier to be low to increase a gain when the load current is lower than a preset first threshold value, and provide high stability to the load current according to the increased gain.

In the embodiment of the present disclosure, the load current measurement unit may adjust the current of the differential amplifier to be high to reduce a gain when the load current is higher than a preset second threshold value, and may improve a transient response characteristic of the load current due to a widened bandwidth according to the reduced gain.

In the embodiment of the present disclosure, the dynamic compensation unit may apply a Miller effect as much as the sum of voltage gains of the gm cell and the differential amplifier to the first main pole.

In the embodiment of the present disclosure, the dynamic compensation unit may apply a Miller effect as much as a voltage gain of the differential amplifier to the second main pole.

According to a capacitor-less low dropout regulator using a dual feedback loop structure like the above, a load current ILOAD can be sensed to dynamically move a pole frequency according to a load, and a Miller effect can be caused at two pole nodes using one amplifier. That is, the Miller effect can be changed by adjusting a current of the amplifier to be large or small according to the load current ILOAD.

Accordingly, operation over a wider range of the load current ILOAD is possible by improving the stability of a feedback loop which drops as the load current ILOAD of a low-dropout (LDO) regulator decreases, and transient response performance can be improved by widening a frequency band as the load current ILOAD increases. Further, since an area of the chip is reduced using a capacitor having a small capacity, a reduction effect in terms of production costs can be caused.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1A:
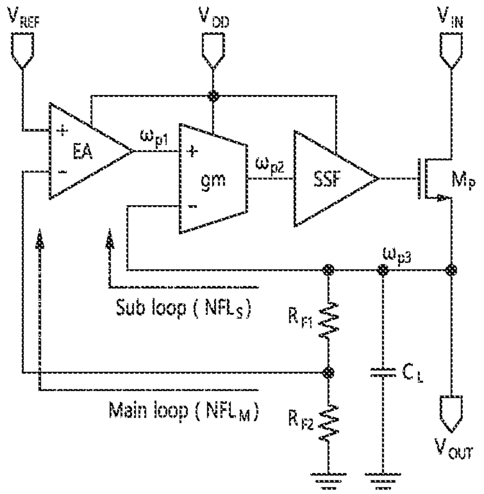
FIG. 1A is a view illustrating a capacitor-less low-dropout (LDO) regulator having a dual feedback loop structure.
Figure 1B:
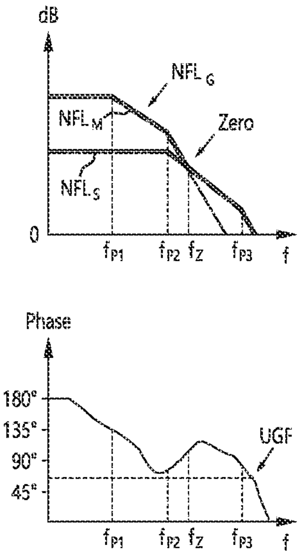
FIG. 1B is a view illustrating a Bode plot according to FIG. 1A.
Figure 2A:
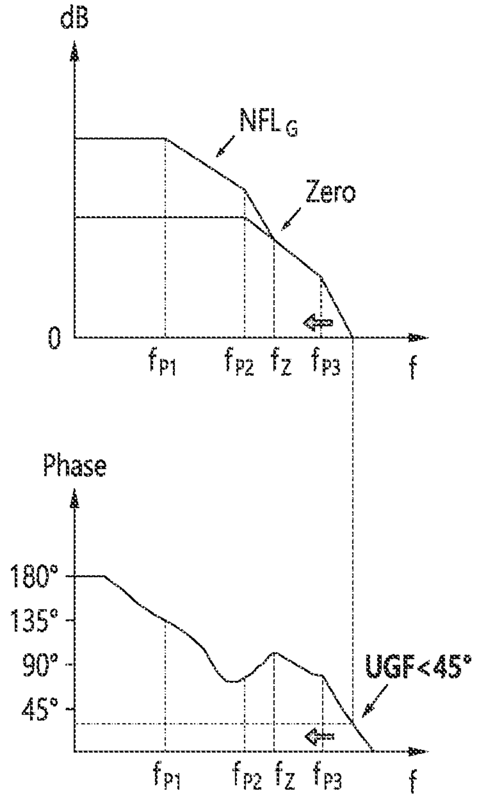
FIG. 2A is a view illustrating a Bode plot in a condition in which a load current is low.
Figure 2B:
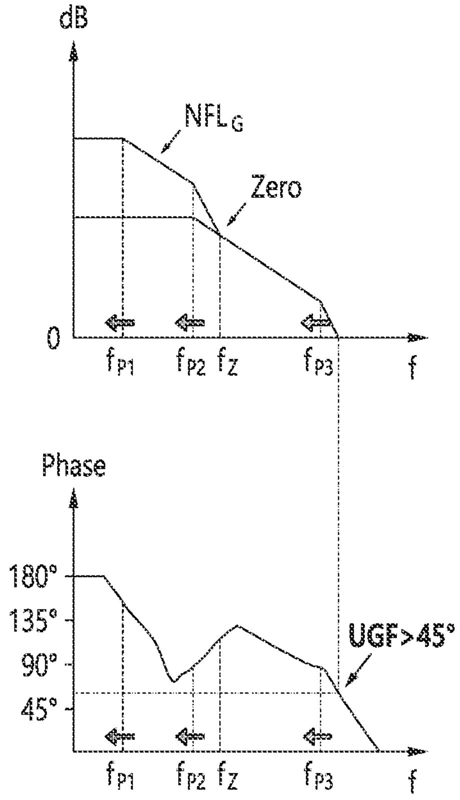
FIG. 2B is a view illustrating a Bode plot in the case in which a compensation capacitor is added.

The detailed description of the present disclosure to be described below will be described with reference to the accompanying drawings which illustrate specific embodiments by way of example. These embodiments are described in sufficient detail so that those skilled in the art may embody the present disclosure. It should be understood that various embodiments of the present disclosure are different from each other but need not be mutually exclusive. For example, a specific shape, structure, and characteristic described herein may be realized in other embodiments without departing from the spirit and scope of the present disclosure in relation to one embodiment. Further, it should be understood that a position or disposition of an individual component in each disclosed embodiment may be changed without departing from the spirit and the scope of the present disclosure. Accordingly, the detailed description to be described below is not intended to be taken in a limiting sense, and the scope of the present disclosure is limited only by the appended claims in an appropriate description, in addition to all scope equivalents of the claims. Similar reference numerals in the drawings refer to the same or similar functions throughout the various aspects.

Hereinafter, preferable embodiments of the present disclosure will be described in more detail with reference to the drawings.

Figure 3:
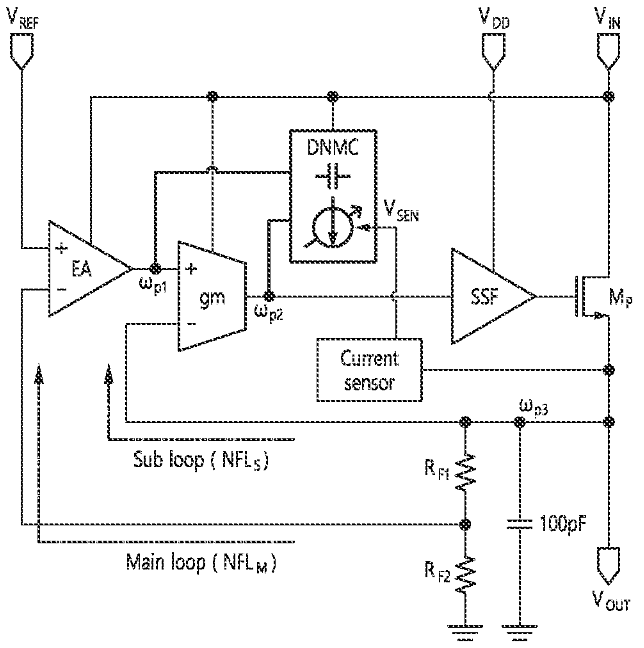
FIG. 3 is a block diagram of a capacitor-less low dropout regulator using a dual feedback loop structure according to one embodiment of the present disclosure.

FIG. 3 is a block diagram of a capacitor-less low dropout regulator using a dual feedback loop structure according to one embodiment of the present disclosure.

A capacitor-less low dropout regulator 10 (hereinafter, referred to as an LDO voltage regulator) using a dual feedback loop structure according to the present disclosure provides a design technology of an analog circuit which variously moves a pole frequency, which is present in in a feedback loop, through a Miller effect.

Specifically, an LDO voltage regulator which enables operation over a wider range of a load current $I_{LOAD}$ by improving the stability of a feedback loop which drops as the load current $I_{LOAD}$ decreases, and improves transient response performance by widening a frequency band as the load current $I_{LOAD}$ increases is provided.

Referring to FIG. 3, the LDO voltage regulator 10 according to the present disclosure includes a capacitor-less dual feedback loop unit, a dynamic compensation unit DNMC, and a load current measurement unit (current sensor).

The capacitor-less dual feedback loop unit has a capacitor-less structure in which an external output capacitor is not present, and a main loop $NFL_M$ passing through feedback resistors $R_{F1}$ and $R_{F2}$ and an error amplifier EA, and a sub-loop $NFL_S$ directly passing through a transconductance cell (hereinafter, referred to as a gm cell) without passing through the error amplifier EA are present.

A capacitor-less LDO regulator not using an external capacitor may provide an accurate output voltage with a low cost and simple structure with only a small ripple. Accordingly, the LDO regulator is used in various semiconductor circuits such as Internet of Things (IoT), a system on chip (SOC), and the like.

In the structure of the capacitor-less dual feedback loop unit, a total of three main poles are present. That is, a first main pole $\omega_{P1}$ which is present at an output of the EA, a second main pole $\omega_{P2}$ located at an output of the gm cell, and last, a third main pole tom placed at the load are present.

The dynamic compensation unit DNMC is connected to the first main pole $\omega_{P1}$ located at the output of the error amplifier EA and the second main pole $\omega_{P2}$ located at the output of the gm cell to provide dynamic frequency compensation using the Miller effect to the first main pole $\omega_{P1}$ and the second main pole $\omega_{P2}$ according to the load current $I_{LOAD}$ of the capacitor-less dual feedback loop unit.

In the LDO regulator, which is a voltage regulator, stably operating over a wide load current range condition and having a fast transient response characteristic when a sudden change in the load current $I_{LOAD}$ occurs are important performance indicators. Further, reducing the use of a capacitor, which occupies a wide area, may reduce unit costs, and thus is important in terms of production.

However, there is a disadvantage in that the capacitor-less LDO regulator has a poor transient response characteristic due to the absence of the external capacitor, and has deteriorated stability when the load current $I_{LOAD}$ is low, and thus may operate only in a narrow range of the load current $I_{LOAD}$.

In order to improve this, although the bandwidth is widened and the transient response characteristic is improved using the dual feedback loop structure, an additional compensation capacitor is required.

Further, in order to reduce bandwidth loss due to the compensation capacitor, a trade-off relationship in which the capacitor-less LDO regulator may stably operate only in a narrow range of the load current $I_{LOAD}$ occurs.

To this end, in the present disclosure, as shown in FIG. 3, a dynamic nested miller compensation unit (a dynamic compensation unit, DNMC) which senses the load current $I_{LOAD}$ and dynamically moves the pole frequency according to the load is proposed.

The dynamic compensation unit DNMC may cause the Miller effect at two pole nodes using only one amplifier, and the Miller effect may be adjusted to be large or small according to the load condition.

In the capacitor-less LDO regulator, since the third main pole $\omega_{P3}$, which is a pole of the load, is located in the highest frequency band, the third main pole $\omega_{P3}$ becomes close to other poles and thus stability of the feedback loop decreases as the load current $I_{LOAD}$ decreases.

Accordingly, when the load current $I_{LOAD}$ is small, stability is secured by increasing the Miller effect of the dynamic compensation unit DNMC, and the bandwidth is widened by decreasing the Miller effect of the dynamic compensation unit DNMC as the load current $I_{LOAD}$ increases.

To this end, a first threshold value and a second threshold value of the load current $I_{LOAD}$ may be preset.

Figure 4:
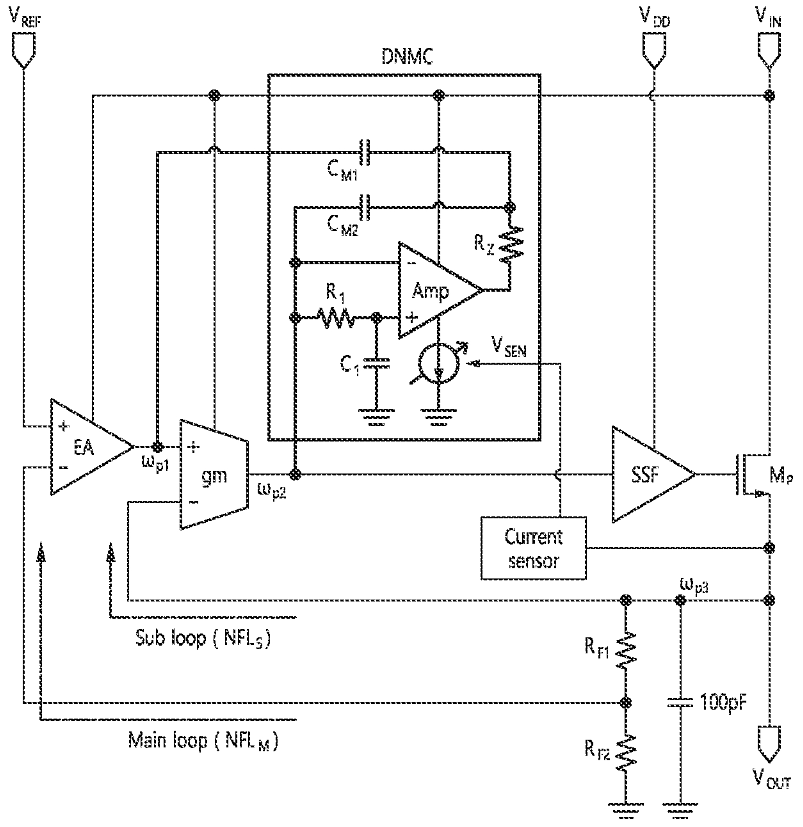
FIG. 4 is a view illustrating the capacitor-less low dropout regulator to which one example of the present disclosure is applied.

A block of the dynamic compensation unit DNMC using the Miller effect which dynamically changes according to a condition of the load current $I_{LOAD}$ through the load current measurement unit (current sensor) proposed in FIG. 3 may be exemplified as in FIG. 4.

FIG. 4 is a view illustrating the capacitor-less low dropout regulator to which one example of the present disclosure is applied.

Referring to FIG. 4, in one embodiment of the present disclosure, the dynamic compensation unit DNMC may include a first compensation capacitor $C_{M1}$ and a second compensation capacitor $C_{M2}$, a differential amplifier Amp, and a low-pass filter R1 and C1. The dynamic compensation unit DNMC may further include a null resistor Rz.

The first compensation capacitor $C_{M1}$ and the second compensation capacitor $C_{M2}$ are respectively connected to the first main pole $\omega_{P1}$ and the second main pole $\omega_{P2}$. The differential amplifier Amp is connected to the second main pole $\omega_{P2}$, and applies the Miller effect differently according to the load current $I_{LOAD}$ transmitted from the load current measurement unit. The low-pass filter R1 and C1 includes a first resistor R1 and a second capacitor C1 connected to the second main pole aim to provide a stable input bias to the differential amplifier Amp.

Nested Miller compensation is a method of performing frequency compensation to two nodes using the Miller effect with only two capacitors $C_{M1}$ and $C_{M2}$ and one amplifier Amp.

Since the frequency compensation to two nodes may be performed with only a small capacitor, the present disclosure is applied to the proposed LDO regulator. In addition, the current of the amplifier is adjusted through the current measurement unit (current sensor) to apply the Miller effect differently according to the current condition of the load.

In this case, since a direct current (DC) voltage value of a node at which the second main pole $\omega_{P2}$ is located is changed according to an operation state, an input bias of the differential amplifier Amp is stably applied through the low-pass filter R1 and C1.

Further, in a conventional Miller compensation method, since a right-half plane (RHP) zero is generated, one null resistor Rz is disposed in series with two capacitors $C_{M1}$ and $C_{M2}$ to effectively remove the RHP zero.

In a detailed description of the operation principle of the dynamic compensation unit DNMC, a Miller effect as much as the sum of voltage gains of the gm cell and the differential amplifier Amp is applied to the first main pole tom.

For example, when the gm cell has a voltage gain of 10 times, and a voltage gain of the differential amplifier Amp which is changed according to an amount of current is $10^{-10}$ times, a Miller capacitor $10^{-100}$ times larger than the first compensation capacitor $C_{M1}$ is applied to the first main pole $\omega_{P1}$ according to the load current $I_{LOAD}$.

Since a Miller effect as much as the voltage gain of the differential amplifier Amp is applied to the second main pole $\omega_{P2}$, Miller compensation $10^{-10}$ times larger than Miller compensation to the second compensation capacitor $C_{M2}$ may be applied to the second main pole $\omega_{P2}$.

As mentioned above, when the load current $I_{LOAD}$ is low, since the third main pole $\omega_{P3}$ is located at a low frequency, the first main pole $\omega_{P1}$ and the second main pole $\omega_{P2}$ should also move to the lower frequency to have stability.

On the other hand, since the third main pole $\omega_{P3}$ moves to a high frequency as the load current $I_{LOAD}$ increases, the first main pole (Um and the second main pole (Um are located at the low frequency, and thus the bandwidth does not need to be lowered. To this end, the Miller effect should change a gain according to the condition of the load current $I_{LOAD}$.

When the load current $I_{LOAD}$ is low, the load current measurement unit (current sensor) has stability through a large Miller effect as the gain of the differential amplifier Amp is large, and thus the current of the differential amplifier Amp is lowered. Conversely, the current of the differential amplifier Amp is increased to lower the gain as the load current $I_{LOAD}$ increases, and the bandwidth is widened to improve the transient response characteristic.

The LDO voltage regulator 10 of the present disclosure may sense the load current $I_{LOAD}$ c to dynamically move the pole frequency according to the load, and may cause the Miller effect at two pole nodes using one amplifier. That is, the Miller effect may be changed by adjusting the current of the amplifier to be large or small according to the load current $I_{LOAD}$.

Accordingly, operation over a wider range of the load current $I_{LOAD}$ is possible by improving stability of the feedback loop which drops as the load current $I_{LOAD}$ of the low-dropout (LDO) regulator decreases, and transient response performance may be improved by widening the frequency band as the load current $I_{LOAD}$ increases. Further, since an area of a chip is reduced using a capacitor having a small capacity, a reduction effect in terms of production costs may be caused.

Figure 5:
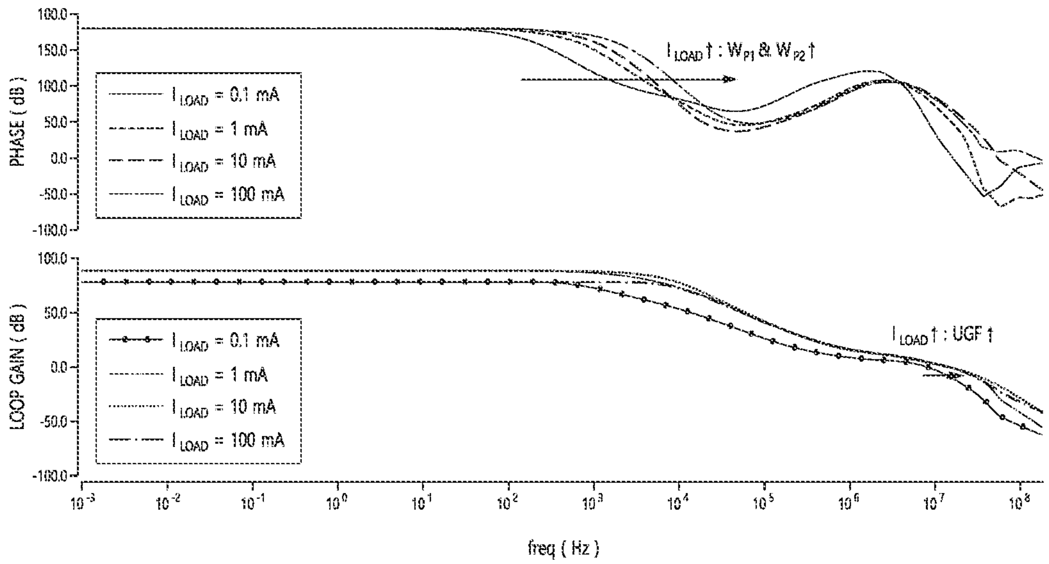
FIG. 5 is a graph illustrating a frequency response waveform according to a load current.

FIG. 5 is a graph illustrating a frequency response waveform according to the load current.

In FIG. 5, $V_{IN}$ is 1.2 V, and $V_{OUT}$ is 1 V, and in the cases in which the load current $I_{LOAD}$ is changed to 0.1 mA, 1 mA, 10 mA, and 100 mA, the Bode plot of the LDO voltage regulator 10 proposed in the present disclosure is shown.

In the load current LOAD conditions, a unity gain frequency (UGF) is changed to 8.1 MHz, 12.9 MHz, 14.6 MHz, and 14.8 MHz, respectively, and a phase margin (PM) shows 64 degrees, 60 degrees, 75 degrees, and 75 degrees.

It can be seen that the UGF is located at a higher frequency compared to a case in which the related art (Non-Patent Document 1 in the Prior Art Document) using a dual loop structure has a maximum of 3 MHz, and the PM shows a stable value of 60 degrees or more in an entire section.

In this case, the first compensation capacitor $C_{M1}$ and the second compensation capacitor $C_{M2}$ are 350 fF and 2 pF, respectively, and show an advantage in that only very small capacitors are used, and thus a smaller area is required compared to the frequency compensation method used in the related art.

In the present disclosure, the load current is sensed in the capacitor-less LDO voltage regulator using a dual feedback loop structure, and the gain of a nested Miller amplifier which compensates the frequency of the pole nodes is dynamically changed using the load current. Accordingly, stable operation may be performed over a wider load current range, and the transient response characteristic may be improved by widening the bandwidth.

In other words, operation over a wider range of the load current $I_{LOAD}$ is possible by improving the stability of the feedback loop which drops as the load current $I_{LOAD}$ of the LDO regulator decreases, and transient response performance may be improved by widening the frequency band as the load current $I_{LOAD}$ increases. Further, since the area of the chip is reduced using the capacitor having the small capacity, the reduction effect in terms of production costs may be caused.

The capacitor-less LDO voltage regulator according to the present disclosure may be used in fields which require power conversion and power management for operating products. For example, the capacitor-less LDO voltage regulator may be used for a smartphone, an IoT device, a solid-state drive (SSD), and the like, and in addition, may be applied to all markets such as a mobile device, a wearable device, and an electronic device which require a function of converting a high input voltage to a low output voltage.

Although the embodiments are described above, those skilled in the art may variously modify and change the present disclosure within the scope not departing from the spirit and region of the present disclosure disclosed in the claims to be described below.

INDUSTRIAL APPLICABILITY

An LDO voltage regulator of the present disclosure can provide an accurate output voltage with a low cost and simple structure with only a small ripple, and thus is frequently applied to back ends of switching type DC-DC converters.

Accordingly, the LDO voltage regulator is used in various semiconductor circuits such as Internet of Things (IoT), a system on chip (SOC), and the like which require accurate and unshakable voltage sources, and specifically, may be applied to a field such as a solid-state drive (SSD) which requires multiple levels of voltage sources in one system.

In addition, the LDO voltage regulator may be used in various fields such as a mobile device, a wearable device, and an electronic device which require a function of converting a high input voltage to a low output voltage.

What is claimed is:

1. A capacitor-less low dropout regulator using a dual feedback loop structure, comprising:

a capacitor-less dual feedback loop unit including a plurality of feedback resistors, an error amplifier, and a transconductance cell (hereinafter, referred to as a gm cell) to form a main loop passing through the error amplifier and a sub-loop passing through the gm cell without passing through the error amplifier;

a dynamic compensation unit connected to a first main pole located at an output of the error amplifier and a second main pole located at an output of the gm cell to provide dynamic frequency compensation using a Miller effect to the first main pole and the second main pole according to a load current of the capacitor-less dual feedback loop unit; and a load current measurement unit configured to measure a load current of a third main pole formed at a load of the dual feedback loop unit to provide the load current to the dynamic compensation unit.

2. The capacitor-less low dropout regulator of claim 1, wherein the dynamic compensation unit includes:

a first compensation capacitor and a second compensation capacitor respectively connected to the first main pole and the second main pole; and a differential amplifier connected to the second main pole, and configured to apply the Miller effect differently according to the load current transmitted from the load current measurement unit.

3. The capacitor-less low dropout regulator of claim 2, wherein the dynamic compensation unit further includes a low-pass filter including a first resistor and a second capacitor connected to the second main pole to provide an input bias of the differential amplifier.

4. The capacitor-less low dropout regulator of claim 3, wherein the dynamic compensation unit further includes a null resistor connected to the first compensation capacitor and the second compensation capacitor in series to remove a right-half plane (RHP) zero generated by the Miller effect.

5. The capacitor-less low dropout regulator of claim 2, wherein the load current measurement unit adjusts a current of the differential amplifier according to the measured load current.

6. The capacitor-less low dropout regulator of claim 5, wherein the load current measurement unit adjusts the current of the differential amplifier to be low to increase a gain when the load current is lower than a preset first threshold value, and provides high stability to the load current according to the increased gain.

7. The capacitor-less low dropout regulator of claim 5, wherein the load current measurement unit adjusts the current of the differential amplifier to be high to reduce a gain when the load current is higher than a preset second threshold value, and improves a transient response characteristic of the load current due to a widened bandwidth according to the reduced gain.

8. The capacitor-less low dropout regulator of claim 2, wherein the dynamic compensation unit applies a Miller effect as much as the sum of voltage gains of the gm cell and the differential amplifier to the first main pole.

9. The capacitor-less low dropout regulator of claim 2, wherein the dynamic compensation unit applies a Miller effect as much as a voltage gain of the differential amplifier to the second main pole.

* * * * *